INVENTOR.
HOWARD D. NUNN

Dec. 8, 1959        H. D. NUNN        2,916,715
PRESSURE TRANSDUCER
Filed April 23, 1958        2 Sheets-Sheet 2

INVENTOR.
HOWARD D. NUNN
BY *Elliott & Pastoriza*
ATTORNEYS

United States Patent Office 2,916,715
Patented Dec. 8, 1959

2,916,715

PRESSURE TRANSDUCER

Howard D. Nunn, Manhattan Beach, Calif., assignor of one-half to Technology Instrument Corporation, a corporation of Massachusetts, and one-half to Robert W. Martin, San Fernando, Calif.

Application April 23, 1958, Serial No. 730,404

10 Claims. (Cl. 338—41)

This invention relates generally to pressure transducers and more particularly to an improved transducer construction and design yielding greater accuracy and enabling easier adjustment and maintenance than similar type instruments heretofore available.

Pressure transducers of the type under consideration comprise basically a pressure capsule mechanically coupled to an electrical component such as a wiper arm, movable slug, or like element for converting physical movement into an electrical signal proportional to the degree of movement. In such systems it is desirable to be able to adjust the range of the output signal in relation to the range of pressures to be measured. This adjustment necessarily entails a changing of the slope of the output characteristic curve of the instrument. It is also desirable to include some means of changing the intercept of the output characteristic curve, and in the event two electrical signal outputs are operated by a single pressure capsule, to be able to properly phase the two outputs with respect to each other. All of these parameters are usually predetermined and incorporated in the design of the instrument when the same is manufactured. As a consequence, if there is any error in the finished product, it is very difficult to readjust the instrument without disassembling a major portion thereof.

Other difficulties in present day pressure devices occur in the various pivotal mountings for movable portions therein. After prolonged use, play may develop in these mountings. Further, misalignment with respect to the pressure capsule of certain of the actuating members can result in poor hysteresis characteristics all of which contribute towards a decrease in the accuracy of the instrument with time.

Bearing the above in mind, it is a general object of the present invention to provide an improved pressure transducer in which the above noted difficulties are overcome.

More particularly, it is an object to provide an instrument of the above type in which the slope and intercept of the output characteristic may be easily set or readjusted without any major disassembly of the instrument itself.

Another object is to provide an instrument incorporating features which enable a minimization of play in the bearings upon which certain of the movable elements are pivoted to the end that a relatively long lived instrument of considerably greater accuracy than heretofore attainable is provided.

Still another object is to provide adjustable means for correcting geometrical inaccuracies in the pressure cell to the end that proper alignment can be maintained and hysteresis effects minimized.

Another object is to provide an improved potentiometer type transducing portion for providing an electrical output signal which indicates with greater fidelity the pressure being measured.

These and many other objects and advantages of the present invention are attained by providing a basic frame structure within which is supported a pressure capsule. An actuating member is connected at one end to the pressure capsule and pivoted at its other end to a potentiometer wiper arm support. This wiper arm support is pivoted to the frame structure for arcuate movement about an axis spaced from the pivot axis of the actuating member. By varying this spacing, the slope of the output characteristic curve may be varied. Further, the means for supporting the pressure capsule to the frame is adjustable so that the effective length of the actuating member between the pressure capsule and the wiper arm support may be varied to alter the intercept of the output characteristic curve.

In one embodiment of the invention, a double output is provided by employing two wiper arms mounted on a yoke structure. In this particular embodiment, further adjustable means are provided for independently varying the position of one wiper arm with respect to the other so that the two may be phased properly with respect to fixed resistances.

In a second embodiment of the invention, a novel type of metal film resistance element is employed and the wiper head incorporates conductive brush bristles arranged to engage this film.

A better understanding of the invention will be had by referring to the preferred embodiments thereof as illustrated in the accompanying drawings, in which.

Figures 1, 2:
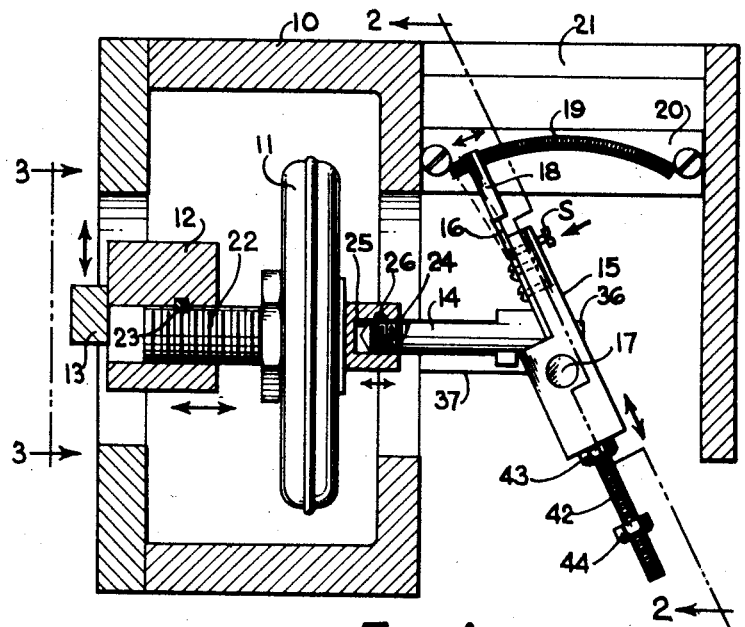
Figure 1 is a side elevational view partly in cross section illustrating a first embodiment of the pressure transducer of the present invention.
Figure 2 is a partial cross sectional view taken in the direction of the arrows 2—2 of Figure 1.

Referring to Figure 1, there is illustrated a frame structure 10 within which is supported a pressure capsule 11 as by means of a block member 12 and cross bar 13 secured to the front portion of the frame. As shown, an actuating member 14 connects to the center portion of the pressure capsule 11 at one end and is pivoted to a wiper arm support 15 at its other end. Wiper arm support 15 supports a first wiper arm 16 and is pivotally mounted to the frame for arcuate movement about a pivot axis 17. By this arrangement, a suitable wiper arm contact head 18 will wipe over an arcuate resistance element 19 secured to a support 20 in turn held on a portion 21 of the frame 10.

In accordance with an important feature of the invention, the pressure capsule 11 is movably supported to the frame 10 so that its distance from the wiper arm support 15 may be varied. To this end, the left hand face of the pressure capsule 11 is provided with a screw 22 threadedly received within the block 12, and after suitable adjustment locked to the block as by a nylon thread lock 23. The opposite face of the capsule 11 is connected to the actuating member 14 through screw threads 24 received within a threaded socket 25, and after suitable adjustment, locked in position as by the nylon thread lock 26. The pitch of the threads within the threaded socket 25 are different from the pitch of the threads within the block 12 so that by rotating the pressure cell, the distance between the cell and the pivot for the wiper arm support may be varied. In other words, the effective length of the actuating member is varied.

The manner in which the wiper arm support 15 is pivoted to the frame structure and the manner in which the free end of the actuating member 14 is pivoted to the wiper arm support 15 will best be seen by referring to the cross sectional end view of Figure 2. As shown in Figure 2, the wiper arm support 15 comprises a yoke structure having upwardly extending yoke arms 27 and 28. Suitable journal shaft supports 29 and 30 extend from opposite sides of the arms 27 and 28 as shown and serve to support reduced diameter journals within suitable journal bearings 31 and 32. The journal bearings 31 and 32 are in turn supported by bearing supports 33 and 34 in the form of screw members threadedly received in sockets 35 and 36. The sockets 35 and 36 are in turn rigidly secured to the frame 10 of Figure 1 as by support members such as 37 for the threaded socket 36.

In the embodiments of Figures 1 and 2, a second wiper arm 16' is secured to the yoke arm 28. As shown in Figure 2, the wiper arm 16' includes a wiper head 18' arranged to engage an arcuate resistance element 19' supported by a resistance support element 20' secured to the frame portion 21.

As shown best in Figure 2, the end of the actuating member 14 extends between the yoke arms 27 and 28 and receives a journal shaft 38 supported within a second yoke member 39 arranged to slide up and down along guideways 40 and 41 on the insides of the yoke arms 27 and 28. The second yoke 39 is held within the two yoke arms 27 and 28 in a desired position by a screw 42 threaded in the base of the wiper support 15 and locked as by a nut 43. A second nut 44 on the screw 42, as clearly shown in both Figures 1 and 2, may be provided as a counterweight with respect to the pivot axis 17 to statically balance the wiper arm. As shown in Figure 2, the axis of the journal shaft 38 is indicated at 45 and is parallel to and spaced from the pivot axis 17 of the wiper arm support 15. By threading the screw 42, the spacing $d$ between the axes 45 and 17 may be varied.

Figure 3:
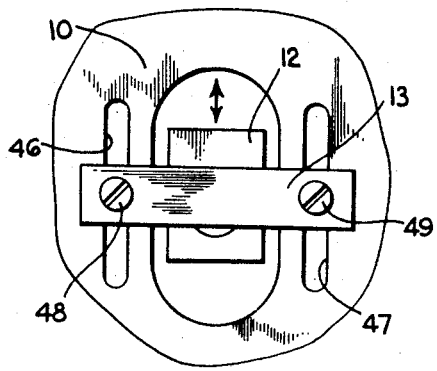
Figure 3 is an end view of the transducer of Figure 1 taken in the direction of the arrows 3—3.

Referring now to Figure 3, the manner in which the block member 12 and cross bar 13 support the pressure capsule 11 to the frame 10 is illustrated more clearly. As shown, the front face of the frame 10 includes a pair of spaced vertical slots 46 and 47 arranged to receive suitable bolts 48 and 49 passing through the cross bar 13. By this arrangement, the vertical position of the block 12 with respect to the frame 10 may be adjusted by suitably sliding the same up and down after the bolts 48 and 49 have been loosened. This adjustment enables a proper alignment to be maintained between the axis of the pressure capsule 11 and the longitudinal axis of the actuating member 14.

In the operation of the device illustrated in Figures 1, 2, and 3, changes in ambient air pressure will result in a change in the differential pressure between the inside and the outside of the capsule 11 which will cause the capsule to expand or contract and thus move the actuating member 14 to the right or left as viewed in Figure 1. Movement of the actuating member 14 to the right, for example, as would take place if the ambient pressure decreased, causes the wiper arm support 15 to rotate in a clockwise direction about the pivot axis 17 to move the wiper arm contact head 18 over the arcuate resistance element 19. With a constant electrical potential applied across the resistance element 19, the voltage picked off by the contact head 18 will vary in accordance with its particular position on the resistance element. Thus, a varying voltage signal will be provided. The actual electrical potential source and various electrical connections are not illustrated in the drawings inasmuch as the same are well known in the art and form no part of the present invention.

Figure 4:
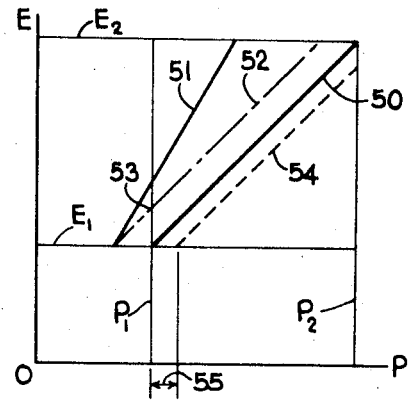
Figure 4 is a plot of the output characteristic of the transducer useful in explaining the operation thereof.

Thus, referring to Figure 4, there is illustrated a plot in which the abscissae represent pressure changes and the ordinates represent voltage values of the output signal.

To illustrate the manner in which the various adjustments in the present invention may be effected, assume that the desired pressure range over which measurements are to be made is defined by $P_1$ and $P_2$ and that the available voltage signal which can be indicated lies between the values $E_1$ and $E_2$. With these outside limits, it is desirable that the relationship be characterized by the output curve 50 which extends substantially over the entire range of the pressure and the entire range of the electrical voltage output.

Because of difficulty in manufacturing to extremely close tolerances, assume that when the instrument is first tested the output characteristic curve is as shown at 51, only a portion of which falls within the desired pressure and voltage ranges. In order to cause the output characteristic curve 51 to coincide with the desired output characteristic curve 50, it is first necessary to alter the slope of the curve 51. In accordance with a first feature of the invention, the slope of this characteristic curve may be varied by changing the vertical distance $d$ between the axes 45 and 17. For example, if the axis 45 is moved further away from the axis 17, the arcuate swing of the wiper arm contact head 18 will be lesser for a given unit movement of the actuating member 14 in response to a unit pressure change in the pressure capsule 11. This adjustment will cause a decrease in the slope of the characteristic curve 51 as plotted in Figure 4. To this end, the threaded screw 42 may be rotated clockwise to thread it further into the yoke base of the wiper arm support 15 thus sliding the second yoke 39 upwardly in the guideways 40 and 41 a short distance. After this adjustment has been effected, the output characteristic curve will be of a slope as indicated by the dash-dot line 52.

It will still be evident that the intercept or point 53 where the curve 52 intersects the lower $P_1$ pressure limit falls above the lowest voltage that can be indicated. It is, therefore, desirable to be able to adjust this intercept point. To this end, the relative position of the pressure capsule 11 with respect to the wiper arm pivot axis 17 may be varied by rotating the capsule to thread the screw 22 and the threaded end of the actuating member 14 with respect to the block 12 and threaded socket 25, respectively. For example, by unthreading the screw 22 from the block 12, the pressure capsule 11 will be moved to the right as viewed in Figure 1 and thus at a given pressure $P_1$ there will appear a voltage indication such as at the point 53. Since it is desired that the lowest voltage $E_1$ be indicated at the pressure $P_1$, the capsule 11 should be moved to the left by threading in the screw 22. As mentioned heretofore, the fine pitch threads in the socket 25 results in a differential movement of the actuating member to vary its effective length. This adjustment will tend to move the contact head towards the lower end of the arcuate resistance element 19 as viewed in Figure 1 without any change in the pressure $P_1$ so that the point 53 will move down to the intersection of the lines $E_1$ and $P_1$ in Figure 4. With the intercept of the characteristic curve properly adjusted, the desired output characteristic will then coincide with the curve 50.

With a dual output such as in the device of Figures 1 and 2, it is possible that after the adjustments have been made for the wiper arm 16 and wiper head 18 with respect to the resistance element 19, the corresponding output of the resistance element 19' and contact head 18' may be slightly different, such as indicated by the dashed curve 54. In order to bring about correspondence between the two outputs, the small adjusting set screw S in the wiper arm support 15 may be threaded in to flex out the wiper arm 16 and thus move the head 18 with respect to the resistance element 19 as indicated by the two headed arrow in Figure 1. Similar adjustments may be made by means of the screw S' in the right hand yoke arm 28 of Figure 2. Thus, the contact heads 18 and 18' may be phased with respect to each other to engage corresponding resistance portions on the respective resistance elements 19 and 19' so that both outputs will be identical and correspond with the desired output curve 50.

With respect to the slope adjustment, it will be recalled that the actuating member 14 was caused to move upwardly slightly to further space apart the axis 45 from the axis 17. In order now to maintain the alignment of the actuating member 14 with the pressure capsule 11, and to overcome any non-co-linearity in the capsule mountings, it is desirable to move up the block member 12 and this may be effected as described in connection with Figure 3 by sliding the cross bar 13 upwardly within the slots 46 and 47. This same adjustment of the block 12 can be used to exert a slight pressure or bias on the pressure capsule and the end bearing shaft 38 of the actuating arm to side load this bearing and thus improve the hysteresis characteristics.

A further feature of the invention resides in the bearing supports and bearing for the wiper arm support 15. As illustrated in Figure 2, by providing the bearing supports in the form of threaded screws 33 and 34, they may be threaded inwardly to press the bearings themselves against the annular shoulders defined by the bearing shaft supports 29 and 30 and the reduced diameter journal shafts. By this arrangement, radial and axial play within these bearings is substantially eliminated.

Figure 5:
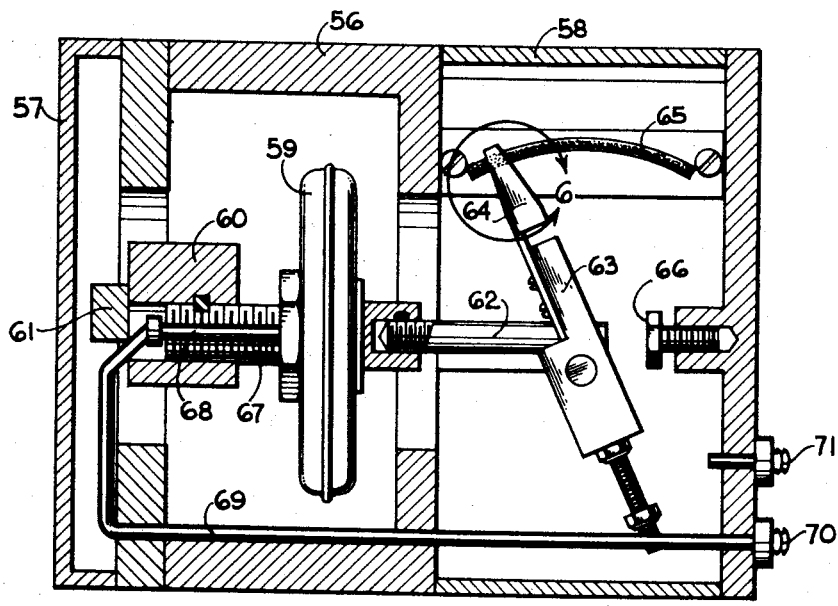
Figure 5 is a side elevational view partly in cross section of a second embodiment of the invention.

In Figure 5 there is shown a modified form of the invention in which an improved wiper head and resistance element may be incorporated. In this embodiment, a frame 56 is provided with hermetically sealed housings 57 and 58 completely enclosing the exposed portions of the transducer mechanism supported within the frame. As shown, there is provided a pressure capsule 59 supported on a block member 60 in turn movably secured to frame 56 as by a cross bar 61 in a manner similar to the securement of the pressure capsule 11 within the frame 10 in the embodiment of Figure 1. In Figure 5, an actuating member 62, is pivoted to a wiper arm support 63 including a wiper head 64 adapted to wipe across an arcuate resistance element 65. A stop in the form of an adjustable screw 66 may be provided to engage the wiper arm support when it has reached its furthest arcuate movement to the right to prevent it from running off the resistance element 65.

In the embodiment of Figure 5, the threaded screw 67 mounting the pressure capsule 59 to the block member 60 is provided with an internal tube 68 communicating with the interior of the pressure capsule 59 and leading out of the frame 56 through a conduit 69 to an outlet nipple 70. A second nipple 71 is in communication with the interior of the frame and is provided so that the entire interior may be completely evacuated. Pressures to be measured are applied through the nipple 70 to the interior of the pressure capsule 59.

Figure 6:
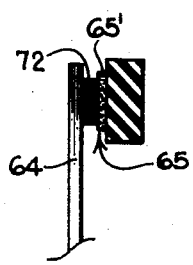
Figure 6 is an enlarged cross sectional view of a portion of the apparatus enclosed within the circular arrow 6 of Figure 5.

The pivotal supports and connections for the actuating member 62 and wiper arm support 63 are identical to those described in connection with the embodiments of Figures 1 and 2 and need not be repeated here. A feature of the embodiment of Figure 5 resides in the wiper arm head 64 and the resistance element 65. As best seen in Figure 6, in this embodiment, the resistance element takes the form of a metal film 65' which provides a greatly improved resistance element while the contact head itself includes pick-off bristles indicated at 72 arranged to wipe on the metal film 65'. The metal film is preserved by the complete evacuation of the interior of the frame.

The various adjustments for changing the slope and intercept of the output characteristic curve described in connection with the embodiments of Figures 1 through 3 are also provided in the embodiment of Figure 5. In Figure 5, only a single wiper arm is provided on the wiper arm support 63, however, so that no phasing screw adjustment is necessary.

From the foregoing description, it will be evident that the present invention provides a greatly improved pressure transducer. By enabling the various adjustments as described to be effected, the instrument may be constructed very simply and economically and the actual design need not be held to extremely close tolerances. Further, by making readjustments periodically, compensation for wear in the various parts may be effected so that the overall accuracy of the instrument is maintained throughout its entire life.

Modifications that fall within the scope and spirit of the present invention will readily occur to those skilled in the art. The pressure transducer is, therefore, not to be thought of as limited to the particular embodiments chosen for illustrative purposes.

What is claimed is:

1. A pressure transducer comprising, in combination: a frame; a pressure capsule mounted to said frame; an actuating member secured to said capsule at one end for movement in response to differential pressure changed between the inside and outside of said capsule; a wiper arm support; first pivot means mounting said support to said frame for pivotal movement about a first axis; second pivot means movably mounted to said wiper arm support connecting the other end of said actuating member to said wiper arm support for pivotal movement relative thereto about a second axis parallel to and spaced from said first axis; an adjustment means on said wiper arm support connected to said second pivot means for varying the distance between said second pivot means and said first pivot means.

2. The subject matter of claim 1, including an adjustable means mounting said capsule to said frame whereby the relative position of said capsule in both transverse and longitudinal directions with respect to said frame may be varied.

3. A pressure transducer comprising, in combination: a frame; a pressure capsule; mounting means securing said capsule to said frame; an arcuate resistance element mounted on said frame; a wiper arm support; first pivot means mounting said wiper arm support to said frame for swinging movement about a first axis; a wiper arm mounted on said wiper arm support for wiping engagement with said arcuate resistance element upon swinging movement of said wiper arm support; an actuating member; means securing one end of said actuating member to said capsule so that differential changes between the inside and outside pressures acting on said capsule move said actuating member; second pivot means connecting the other end of said actuating member to said wiper arm support for pivoting movement relative thereto about a second axis parallel to and spaced a given distance from said first axis; and means on said wiper arm support for varying said given distance between said first axis and said second axis whereby the distance traveled by said wiper arm along said resistance element per unit change in movement of said actuating member may be changed.

4. The subject matter of claim 3, in which said mounting means securing said capsule to said frame is movable with respect to said frame to change the distance between said capsule and said second pivot means whereby the starting points of said wiper arm on said resistance element may be varied independently of movement of said actuating arm in response to changes in said differential pressure.

5. The subject matter of claim 4, in which said capsule includes a threaded receiving socket for threadedly receiving said one end of said actuating member whereby the effective length of said actuating member between said capsule and said second pivot means may be varied.

6. The subject matter of claim 5, in which said first pivot means includes journal shaft supports extending from opposite sides of said wiper arm support and terminating in reduced diameter journals defining annular shoulders; journal bearings receiving said journals; and means connected between said journal bearings and said frame for exerting pressure on said journal bearings to urge the same against said annular shoulders.

7. The subject matter of claim 6, including static balancing means secured to said wiper arm support.

8. The subject matter of claim 7, in which said wiper arm support comprises a yoke member having upwardly extending yoke arms from which said journal shaft supports extend; said wiper arm being secured to one of said yoke arms; a second wiper arm secured to the other of said yoke arms; a second arcuate resistance element supported to said frame for engagement by said second wiper arm; and phasing means for independently altering the relationship of said wiper arms with respect to said yoke arms so that corresponding points on said resistance elements may be engaged.

9. The subject matter of claim 7, in which said frame is enclosed in an hermetically sealed housing and said resistance element comprises conductive film material, said wiper arm having conductive brush bristles engaging said film material.

10. The subject matter of claim 9, including stop means secured to said frame adjacent to one end of said resistance element to engage said wiper arm support and limit its arcuate swing.

References Cited in the file of this patent

UNITED STATES PATENTS

| | | |
|---|---|---|
| 2,229,417 | Mason et al. | Jan. 21, 1941 |
| 2,443,252 | Kelly | June 15, 1948 |
| 2,466,071 | Barnes | Apr. 5, 1949 |
| 2,724,760 | Giannini | Nov. 22, 1955 |
| 2,811,619 | Bourns | Oct. 29, 1957 |
| 2,841,674 | Bourns | July 1, 1958 |